United States Patent [19]
Zajac

[11] 3,963,946
[45] June 15, 1976

[54] DRIVER CIRCUIT FOR STEP MOTOR

[75] Inventor: Chester J. Zajac, Litchfield, Conn.

[73] Assignee: Robertshaw Controls Company, Richmond, Va.

[22] Filed: Feb. 21, 1975

[21] Appl. No.: 551,866

[52] U.S. Cl. .......................... 307/270; 307/220 C; 307/251; 318/696
[51] Int. Cl.² ........................................ H07K 17/00
[58] Field of Search ...................... 307/270, 220, 2; 318/341, 231, 696; 328/39

[56] References Cited
UNITED STATES PATENTS 3,416,057   12/1968   Froyd et al. ................. 318/231
3,673,438   6/1972   Lund ................................ 307/270

Primary Examiner—Stanley D. Miller, Jr.
Assistant Examiner—B. P. Davis
Attorney, Agent, or Firm—O'Brien & Marks

[57] ABSTRACT

A driver circuit for a step motor includes a binary divider circuit for generating pulse outputs of decreasing frequency which are applied to inputs of a logic circuit to generate a output pulses of a predetermined width and frequency. The logic circuit is provided with facilities for selecting the width of the pulses from a plurality of selected widths.

8 Claims, 3 Drawing Figures

3,963,946

DRIVER CIRCUIT FOR STEP MOTOR

BACKGROUND OF THE INVENTION

1. Field of the Invention

This invention relates to driver circuits, and in particular, to circuits for driving step motors, such as clock motors.

2. Description of the Prior Art

The prior art, as exemplified in U.S. Pat. No. 3,631,528, 3,673,438, and 3,801,795, contains a number of driver circuits including clock motor driving circuits. The prior art circuits generally have one or more deficiencies such as being incapable of handling different motor loads without extensive circuit changes or modifications which can not be made in integrated circuits, being incapable of different pulse lengths for different motor applications, utilizing complementary metal-oxide-silicon circuitry devices which do not have equal current sourcing and sinking capability, utilizing excessive components, being too expensive, being unreliable in operation, and the like.

SUMMARY OF THE INVENTION

The invention is summarized in that a driver circuit for a step motor includes a binary divider circuit having a plurality of at least first, second and third serially connected binary stages and a input responsive to signals of a first frequency, said stages having respective outputs upon which pulses having respective decreasing frequencies corresponding to succeeding divisions of the first frequency are generated; first gating means having a plurality of at least first, second and third inputs with the first and second inputs of the first gating means connected to the outputs of the respective second and third stages, said first gating means having an output upon which pulses of a frequency determined by the frequency on the output of the third stage are produced; amplifier means connected to the output of the first gating means for generating motor driving pulses; second gating means having a first input, a second input, and an output, the first input of the second gating means connected to the output of the first stage of the divider circuit, the output of the second gating means connected to the third input of the first gating means; and means connected to the second input of the second gating means, for selecting the operation of the second gating means to determine the width of pulses produced by the amplifier means.

An object of the invention is to construct a driver circuit which is reliable and relatively inexpensive for driving a step motor.

Another object of the invention is to provide a driver circuit which is flexible enough to handle a variety of motor loads without circuit changes or modifications.

It is also an object of the invention to form a substantially integrated driver circuit which can be easily changed by external modifications to change the duty cycle of the output pulses without changing the frequency of the output pulse.

One advantage of the invention is that the width of driving pulses for a motor load can be selected by selective connection of a plurality of external terminals.

A feature of the invention is that a driver circuit utilizes integral metal-oxide-silicon circuitry, and is complemented with a bipolar device in order to form an output driving circuit flexible enough to handle a variety of motor loads.

Other objects, advantages and features of the invention will become apparent from the following description taken in conjunction with the accompanying drawings.

DESCRIPTION OF THE PREFERRED EMBODIMENTS

Figure 1:
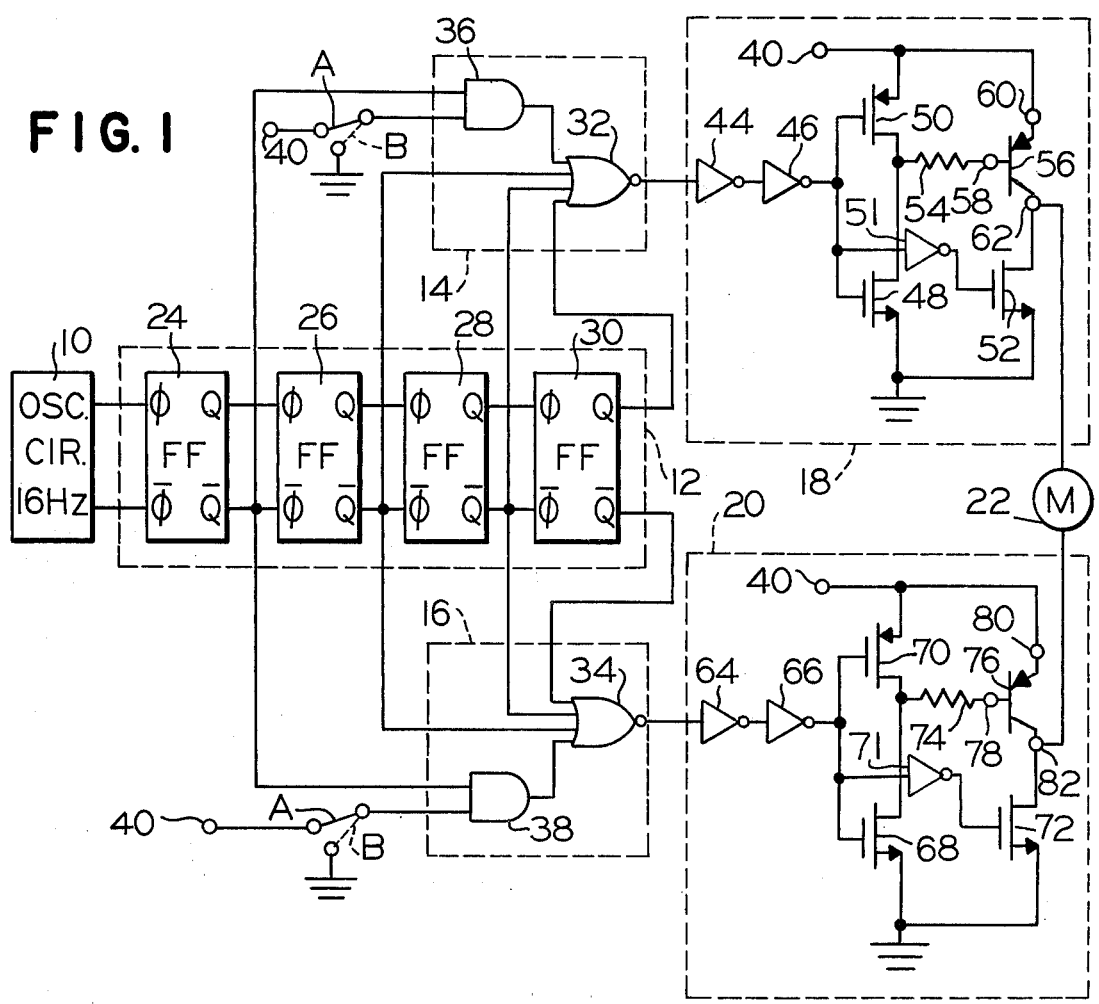
FIG. 1 is a schematic diagram of a driver circuit in accordance with the invention.

As illustrated in FIG. 1 the invention is embodied in a driver circuit including an oscillator circuit 10, a frequency divider or binary counting circuit 12 connected to the oscillator circuit 10, logic circuits 14 and 16 connected to selected outputs of the divider circuit 12, and power amplifying circuits 18 and 20 connected to outputs of the respective logic circuits 14 and 16 for driving a stepping motor 22.

The oscillator circuit 10 is a conventional oscillator circuit which may include a high frequency oscillator and divider circuits for producing suitable opposite phase signals on its outputs for driving the divider 12. For example, the oscillator output may be a square wave signal of 16 Hz. The outputs of the oscillator circuit 10 are connected to respective opposite phase inputs $\phi$ and $\bar\phi$ of the first stage 24 of the frequency divider circuit 12 which has stages 24, 26, 28, and 30. Preferably, the stages 24, 26, 28 and 30 are complementary flip flop circuits having Q and $\bar Q$ with the outputs of stages 24, 26 and 28 connected to opposite phase inputs $\phi$ and $\bar\phi$ of succeeding stages in a conventional binary counter arrangement.

The Q outputs of stages 26 and 28 are connected to respective inputs of NOR gate 32 in the logic circuit 14 and also to respective inputs of NOR gate 34 in logic circuit 16. The Q output of the stage 30 is connected to another input of the NOR gate 32 while the $\bar Q$ output of the stage 30 is connected to another input of the NOR gate 34. The Q output of the stage 24 is connected to one inputs of AND gates 36 and 38 which have second inputs connected by way of selective external connections A to a positive voltage terminal 40. Alternately, the second inputs of AND gates 36 and 38 can be connected by way of selective external connections B to ground. The outputs of AND gates 36 and 38 are connected to fourth inputs of the respective NOR gates 32 and 34.

The power amplifier circuit 18 has a serial pair of inverter amplifiers 44 and 46 connecting the output of the logic circuit 14 from NOR gate 32 to gates of field effect transistors 48 and 50. An inverter 51 connects the output of amplifier 46 to the gate of a field effect transistor 52. The field effect transistors 48 and 52 are N-channel devices while the field effect transistor 50 is a P-channel device. The transistors 48 and 50 have their drains connected at a common junction while the source of transistor 50 is connected to a positive voltage terminal and the source of transistor 48 connected to a negative terminal or ground. The junction between the drains of the transistors 48 and 50 is connected by a resistor 54 to the base of a bipolar PNP transistor 56 which has its collector connected to the drain of the transistor 52. The emitter of the transistor 56 is connected to the positive voltage terminal while the source of transistor 52 is connected to the ground. The junction of the collector of the transistor 56 and the drain of the transistor 52 is connected to one input terminal of the motor 22.

Similarly, the power gate circuit 20 has serial input inverter amplifiers 64 and 66, field effect transistors 68, 70 and 72, inverter 71, a resistor 74, and a bipolar transistor 76 connected together in the same manner as the inverter amplifiers 44 and 46, the field effect transistor 48, 50 and 52, inverter 51, the resistance 54, and the bipolar transistor 56 of the power drive circuit 18. The input of amplifier 64 is connected to the output of logic circuit 16, while the junction of the collector of transistor 76 and the drain of transistor 52 is connected to the other input terminal of the motor 22.

It is preferred that the oscillator 10, the frequency divider 12, the logic circuits 14 and 16, and the power amplifier circuits 18 and 20 except for bipolar transistors 56 and 76 and external frequency control devices such as crystals be formed by complementary metal-oxide-silicon (CMOS) technology as an integral device or circuit. The integrated circuit is provided with terminals 58, 60 and 62 for connecting the base, emitter and collector respectively, of the bipolar transistor 56 into the circuit as an external device, and terminals 78, 80 and 82 for connecting the base, emitter and collector respectively, of the transistor 76 into the circuit as an external device.

In operation of the motor driving circuit of FIG. 1, the output frequency of the oscillator 10 is divided by two by the first stage 24, the output frequency of the stage 24 is divided by two by the stage 26, the output frequency of the stage 26 is divided by two by the stage 28 and the stage 30 further divides the output frequency of stage 28 by two. For example, with the oscillator 10 having a frequency of 16 Hz, the output frequency of the stage 24 is 8 Hz, the output frequency of the stage 26 is four Hz, the output frequency of the stage 28 is 2 Hz, and the output frequency of stage 30 is 1 Hz.

Figure 2:
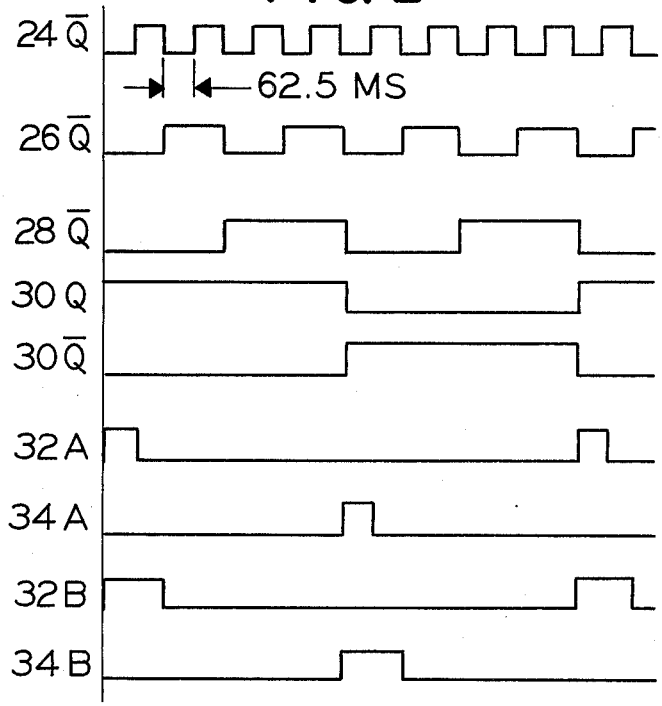
FIG. 2 is a graph of wave forms produced at various points in the circuit of FIG. 1.

With the second inputs of AND gates 36 and 38 selectively connected by external connection A to the high voltage terminal 40, the AND gates 36 and 38 are enabled to pass the output pulses of the Q output of stage 24 to the fourth inputs of the NOR gates 32. The NOR gate 32 produces a positive or high pulse when all of its inputs are zero or low; thus, as shown in FIG. 2, the NOR gate 32 produces a positive voltage pulse in waveform 32A when the Q outputs of stages 24, 26 and 28 and the Q output of stage 30 are all low. Similarly, the NOR gate 34 produces a positive of high pulse in waveform 34A only when the Q outputs of stages 24, 26, 28 and 30 are all low. Since the Q and Q outputs of stage 30 are oppositely high and low, the pulses from NOR gates 32 and 34 are separated in time by one-half the period for a complete waveform cycle; thus, the pulses from NOR gates 32 and 34 have the necessary phase relationship needed to drive the motor 22. The duration of the pulses from NOR gates 32 and 34 when the connections A are present corresponds to the width of the negative going pulses from the Q output of stage 24.

When the output of NOR gate 32 is low, the transistors 48 and 56 are non-conductive while the transistors 50 and 52 are in their conductive states. During the pulse output or high voltage from the NOR gate 32, the inverter amplifiers 44 and 46 drive the transistor 48 conductive and the transistor 50 non-conductive while the inverter 51 drives the gate of transistor 52 low to render transistor 52 non-conductive, and the junction of the drains of the transistors 48 and 52 drops low to render the transistor 56 conductive by the low voltage applied to its base through resistor 54. Thus, the input line of motor 22 connected to the junction of the drain of the transistor 52 and the collector of transistor 56 is driven from low to high during the pulse.

Similarly, when the output of the NOR gate 34 goes positive, transistors 68 and 76 are driven into conductivity while the transistors 70 and 72 are rendered non-conductive to produce a positive going pulse from the junction of the collector of transistor 76 and the drain of transistor 72.

A longer duration of the output pulse can be selected by eliminating the connections A and substituting the connections B to hold the second inputs of AND gates 36 and 38 low; this disables AND gates 36 and 38 to maintain their outputs low. Thus, the high voltage output of NOR gate 32 occurs during the coincidence of low voltages on Q outputs of stages 26 and 28 and the Q output of stage 30; the output waveform of stage 24 has no affect on the output pulse duration from gate 32. Similarly, the high output of NOR gate 34 occurs during the coincidence of low voltages on Q outputs of stages 26, 28 and 30. The width of pulses in waveforms 32B and 34B from NOR gates 42 and 34, respectively, corresponds to the duration of negative going pulses from Q output of stage 26 when the connections B are present.

Allowing the width of the pulse to be selected by simple external connections enables the driver circuit to be utilized with a wider variety of step motors. Some motors may require the wider driving pulses while, with other motors, the smaller width pulses may be adequate, thus conserving energy consumption. Using the complementary metal-oxide-silicon circuitry further aids in conserving energy.

Circuits employing P-channel field effect transistors for complementing power N-channel field effect transistors 52 and 72 do not have uniformity in their power outputs due to the inability to form integral complementary P- and N-channel power field effect transistors having equal current sourcing and sinking capability. This is because integral P-channel MOS transistors do not have the power gain that N-channel MOS transistors have on a comparative size basis. Thus, to achieve equal capability between complementary P-channel and N-channel devices would require a P-channel device of approximately four times larger than the N-channel device producing substantial inequality in the circuit. The present circuit of FIG. 1 uses the N-channel transistors 52 and 72 which have a high current sinking capability and are complemented with the two PNP external transistors 56 and 76. This arrangement provides a composite circuit which is more versatile, is capable of handling varied motor load requirements, and is less expensive than if both P-channel MOS devices and N-channel MOS devices were included in the same integral chip or device.

Figure 3:
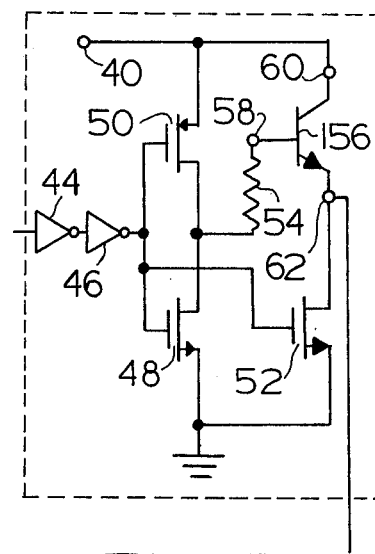
FIG. 3 is a diagram of a modification of the circuit of FIG. 1.

A modification of the driver circuit 18, as illustrated in FIG. 3, has an NPN bipolar transistor 156 substituted for the bipolar PNP transistor 56 of FIG. 1. The base of the transistor 156 is connected to the terminal 58, the collector of the transistor 156 is connected to the terminal 60 while the emitter of the transistor 156 is connected to the terminal 62. The output of inverter amplifier 46 is directly connected to the gate of field effect transistor 52, thus eliminating the inverter 51 of FIG. 1. A similar change can be made in the power driving circuit 20. In the modified circuit of FIG. 3, the transistors 48 and 52 are driven conductive and the transistors 50 and 156 are rendered non-conductive when the output of inverter amplifier 46 is high; and vice versa when the output of inverter amplifier 46 is low.

Since many modifications, variations and changes in detail may be made to the presently described driver circuit, it is intended that all matter shown in the foregoing description and shown in the accompanying drawings be interpreted as illustrative and not in a limiting sense.

What is claimed is:

1. A driver circuit for a step motor comprising
   a binary divider circuit having a plurality of at least first, second and third serially connected binary stages and an input responsive to signals of a first frequency, said stages having respective outputs upon which pulses having respective decreasing frequencies corresponding to succeeding divisions of the first frequency are generated;
   first gating means having a plurality of at least first, second and third inputs with the first and second inputs of the first gating means connected to the outputs of the respective second and third stages, said first gating means having an output upon which pulses of a frequency determined by the frequency on the output of the third stage are produced;
   amplifier means connected to the output of the first gating means for generating motor driving pulses;
   second gating means having a first input, a second input, and an output, the first input of the second gating means connected to the output of the first stage of the divider circuit, the output of the second gating means connected to the third input of the first gating means; and
   means, connected to the second input of the second gating means, for selecting the operation of the second gating means to determine the width of pulses produced by the amplifier means.

2. A driver circuit for a step motor as claimed in claim 1 wherein the first gating means includes
   a pair of gating circuits each of which is connected to all stages except the first stage of the binary divider circuit wherein the pair of gating circuits is connected to opposite polarity outputs of the last stage of the binary divider circuit.

3. A driver circuit for a step motor as claimed in claim 1 wherein the amplifier means connected to the output of the first gating means includes
   first and second complementary field effect transistors connected in series across a voltage source and having their gates connected to the output of the first gating means,
   a third field effect transistor,
   means connecting the gate of the third field effect transistor to the output of the first gating means, and
   a bipolar transistor having its collector and emitter connected in series with the source and drain of the third field effect transistor across the voltage source and having its base electrode connected to the junction between the first and second field effect transistors.

4. A driver circuit for a step motor comprising
   oscillator circuit means for generating pulses of a first frequency;
   a frequency divider including first, second, third and fourth serial flip-flop circuits connected as a binary counting circuit with the first flip-flop having its input connected to the oscillator circuit means, said frequency divider having respective outputs from the first, second and third flip-flops and a pair of complementary outputs from the fourth flip-flop;
   a first gate means having first and second inputs and output means with the first input connected to the output of the first flip-flop and with the second input controlling the first gate means to selectively produce on the output means a steady signal or the pulse signal from the output of the first flip-flop;
   a second gate means having an output and at least first, second, third and fourth inputs with the first input connected to the output means of the first gate means, with the second and third inputs connected to the respective outputs of the second and third flip-flops, and with the fourth input connected to one of the pair of complementary outputs of the fourth flip-flop, said second gate means producing a signal on its output during coincidence of signals on its first, second, third, and fourth inputs;
   a third gate means having an output and at least first, second, third and fourth inputs with the first input connected to the output means of the first gate means, with the second and third inputs connected to the respective outputs of the second and third flip-flops, and with the fourth input connected to the other of the pair of complementary outputs of the fourth flip-flop, said third gate means producing a signal on its output during coincidence of signals on its first, second, third, and fourth inputs; and
   a pair of amplifier means connected to the outputs of the respective second and third gate means for generating respectively phased motor driving pulses.

5. A driver circuit for a step motor as claimed in claim 4 wherein each of the pair of amplifier means includes
   a pair of complementary field effect transistors connected in series across a voltage source and having their gates connected to the output of the first gate means,
   a third field effect transistor,
   means connecting the gate of the third field effect transistor to the output of the first gate means, and
   a bipolar transistor having its collector and emitter connected in series with the source and drain of the third field effect transistor across the voltage source and having its base electrode connected to the junction between the pair of field effect transistors.

6. A driver circuit for a step motor as claimed in claim 5 wherein
   the frequency divider, the first gate means, the second gate means, the third gate means, the first and second complementary field effect transistors, and the third field effect transistor are formed by complementary metal-oxide-silicon technology.

7. A driver circuit for a step motor comprising
   an oscillator circuit for generating a signal of a first frequency;

a binary divider circuit having a plurality of serially connected binary stages and an input connected to the oscillator circuit, said plurality of stages having respective outputs upon which pulses having respective decreasing frequencies corresponding to succeeding divisions of the first frequency are generated, the last of said plurality of stages having first and second complementary outputs;

a pair of logic circuit means each connected to selected outputs of the plurality of stages for producing output pulses when there is a coincidence of pulses on the respective selected outputs, one of the pair of logic circuit means connected to the first output of the last stage and the other of the pair of logic circuit means connected to the second output of the last stage such that the one and other logic means produce pulses of different phase; and a pair of amplifier means responsive to the output pulses of the respective pair of logic circuit means for generating respectively phased motor driving pulses.

8. A driver circuit for a step motor as claimed in claim 7 wherein each of the pair of amplifier means includes first and second complementary field effect transistors connected in series across a voltage source and having their gates connected to the output of the first gating means, a third field effect transistor having its gate connected to the output of the first gating means, and a bipolar transistor having its collector and emitter connected in series with the source and drain of the third field effect transistor across the voltage source and having its base electrode connected to the junction between the first second field effect transistors.

* * * * *